US012380926B2

(12) United States Patent
Lu et al.

(10) Patent No.: US 12,380,926 B2
(45) Date of Patent: Aug. 5, 2025

(54) VIDEO GENERATION METHOD, APPARATUS, DEVICE, AND STORAGE MEDIUM

(71) Applicant: Beijing Zitiao Network Technology Co., Ltd., Beijing (CN)

(72) Inventors: Zhixiong Lu, Beijing (CN); Sijing Wen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/777,868

(22) Filed: Jul. 19, 2024

(65) Prior Publication Data
US 2024/0379129 A1    Nov. 14, 2024

Related U.S. Application Data

(63) Continuation of application No. PCT/CN2023/071620, filed on Jan. 10, 2023.

(30) Foreign Application Priority Data

Jan. 19, 2022 (CN) .......................... 202210060992.1

(51) Int. Cl.
*G11B 27/031*        (2006.01)
*G06T 7/11*          (2017.01)
(Continued)

(52) U.S. Cl.
CPC ............ *G11B 27/031* (2013.01); *G06V 10/26* (2022.01); *G06V 20/41* (2022.01); *G06V 20/46* (2022.01);
(Continued)

(58) Field of Classification Search
None
See application file for complete search history.

(56) References Cited

U.S. PATENT DOCUMENTS

| | | | |
|---|---|---|---|
| 5,425,111 A | 6/1995 | Kitaura et al. | |
| 2013/0150719 A1* | 6/2013 | Orderud | G06T 19/00 600/443 |

(Continued)

FOREIGN PATENT DOCUMENTS

| | | |
|---|---|---|
| CN | 106462986 A | 2/2017 |
| CN | 108492348 A | 9/2018 |

(Continued)

OTHER PUBLICATIONS

International Patent Application No. PCT/CN2023/071620; Int'l Written Opinion and Search Report; dated Jun. 5, 2023; 6 pages.

(Continued)

*Primary Examiner* — Hung Q Dang
(74) *Attorney, Agent, or Firm* — BakerHostetler

(57) ABSTRACT

Disclosed in the embodiments of the present disclosure are a video generation method, an apparatus, a device, and a storage medium. Grayscale processing is performed on a to-be-processed video, to obtain a grayscale video; region segmentation is performed on video frames in the grayscale video, to obtain a plurality of image regions; a coloring order is determined for the plurality of image regions; and coloring is performed sequentially on the plurality of image regions according to the coloring order, to obtain a target video.

20 Claims, 3 Drawing Sheets

(51) Int. Cl.
  *G06T 7/194* (2017.01)
  *G06T 11/00* (2006.01)
  *G06T 11/60* (2006.01)
  *G06V 10/26* (2022.01)
  *G06V 20/40* (2022.01)
  *G06V 40/20* (2022.01)
  *H04N 9/64* (2023.01)
  *H04N 23/60* (2023.01)
  *H04N 23/611* (2023.01)
  *H04N 23/80* (2023.01)

(52) U.S. Cl.
  CPC .............. *G06V 20/49* (2022.01); *G06V 40/20* (2022.01); *H04N 9/64* (2013.01)

(56) References Cited

U.S. PATENT DOCUMENTS

2013/0293469 A1* 11/2013 Hakoda ................. G06F 3/013
                                                                    345/158
2021/0319596 A1   10/2021 Lee et al.
2022/0189029 A1*  6/2022 Mequanint ............. G06T 7/194

FOREIGN PATENT DOCUMENTS

| CN | 109754444 A | 5/2019 |
| CN | 110276840 A | 9/2019 |
| CN | 110515452 A | 11/2019 |
| CN | 111340921 A | 6/2020 |
| CN | 111815733 A | 10/2020 |
| CN | 113411550 A | 9/2021 |
| CN | 113822951 A | 12/2021 |
| CN | 114422698 A | 4/2022 |
| JP | 2011-118825 A | 6/2011 |

OTHER PUBLICATIONS

Brannan K., "How to Use Selective Color in a Black-and-White Video with Premiere Pro," Pond5 Blog, 2018, pp. 1-13, XP093258839, Retrieved from the Internet: URL:https://web.archive.org/web/20210119192032/https://blog.pond5.com/19819-how-to-use-selective-color-in-a-black-and-white-video-with-premiere-pro/ [retrieved on Mar. 12, 2025].

Communication pursuant to Rules 70(2) and 70a(2) EPC for European Application No. 23742756.2, mailed Apr. 8, 2025, 1 page.

Extended European Search Report for European Application No. 23742756.2, mailed Mar. 21, 2025, 11 pages.

* cited by examiner

VIDEO GENERATION METHOD, APPARATUS, DEVICE, AND STORAGE MEDIUM

CROSS-REFERENCE TO RELATED APPLICATION(S)

The present disclosure is a continuation of International Patent Application No. PCT/CN2023/071620, filed Jan. 10, 2023, which claims the priority from the CN patent application Ser. No. 20/221,0060992.1 filed with the China National Intellectual Property Administration on Jan. 19, 2022, the contents of which are hereby incorporated by reference in their entireties.

FIELD

Embodiments of the present disclosure generally relate to the field of image processing technologies, for example, to a video generation method, an apparatus, a device, and a storage medium.

BACKGROUND

In recent years, smart terminal devices become indispensable tools for users. The users can take pictures and shoot videos to record moments in life in the form of videos, pictures, and the like through smart terminals. In addition, users can perform reprocessing on short videos through the terminal devices, such that the moments can be presented in richer forms, for example, beautification, stylization, expression editing, and the like.

SUMMARY

Embodiments of the present disclosure provide a video generation method, an apparatus, a device, and a storage medium In a first aspect, embodiments of the present disclosure provide a video generation method, comprising:
  performing grayscale processing on a to-be-processed video, to obtain a grayscale video;
  performing region segmentation on video frames in the grayscale video, to obtain a plurality of image regions;
  determining a coloring order for the plurality of image regions; and
  performing coloring sequentially on the plurality of image regions according to the coloring order, to obtain a target video.

In a second aspect, embodiments of the present disclosure provide a video generation apparatus, comprising:
  a grayscale video obtaining module configured to perform grayscale processing on a to-be-processed video, to obtain a grayscale video;
  a segmentation module configured to perform region segmentation on video frames in the grayscale video, to obtain a plurality of image regions;
  a coloring order determining module configured to determine a coloring order for the plurality of image regions; and
  a coloring module configured to perform coloring sequentially on the plurality of image regions according to the coloring order, to obtain a target video.

In a third aspect, embodiments of the present disclosure further provide an electronic device, comprising:
  one or more processing units;
  a storage storing one or more computer programs;
  wherein the one or more computer programs, when executed by the one or more processors, cause the one or more processing units to implement the video generation method according to the embodiments of the present disclosure.

In a fourth aspect, embodiments of the present disclosure provide a computer readable medium having computer programs stored thereon, wherein the computer programs, when executed by a processing unit, implement the video generation method according to the embodiments of the present disclosure.

DETAILED DESCRIPTION OF EMBODIMENTS

Reference now will be made to the drawings to describe the embodiments of the present disclosure. Although the drawings illustrate some embodiments of the present disclosure, the present disclosure can be implemented in various forms, and should not be construed as being limited to the embodiments described above. Rather, those embodiments are provided for a thorough and complete understanding of the present disclosure. It would be appreciated that the drawings and embodiments of the present disclosure are provided only as examples, without suggesting any limitation to the protection scope of the present disclosure.

It would be appreciated that respective steps in the implementations of the method according to the present disclosure may be performed in different orders and/or performed in parallel. In addition, the method implementations may include additional steps and/or steps omitted. The scope of the present disclosure is not limited thereto.

As used herein, the term "includes" and its variants are to be read as open-ended terms that mean "includes, but is not limited to." The term "based on" is to be read as "based at least in part on." The term "an embodiment" is to be read as "at least one embodiment;" the term "another embodiment" is to be read as "at least one further embodiment;" the term "some embodiments" is to be read as "at least some embodiments." Related definitions of other terms will be provided in the description below.

It should be noted that, the terms "first," "second" and the like mentioned in the present disclosure are only used to distinguish different apparatuses, modules or units, rather than limit an order of functions performed by the apparatus, module or unit or limit interdependence.

It should be noted that, the terms "one" and "a plurality of" mentioned in the present disclosure are illustrative, not restrictive, and should be understood as "at least one" by those skilled in the art, unless explicitly specified otherwise in the context.

Names of messages or information interacted between a plurality of apparatuses in the embodiments of the present disclosure are illustrative rather than limit the scope of the message or information.

Figure 1:
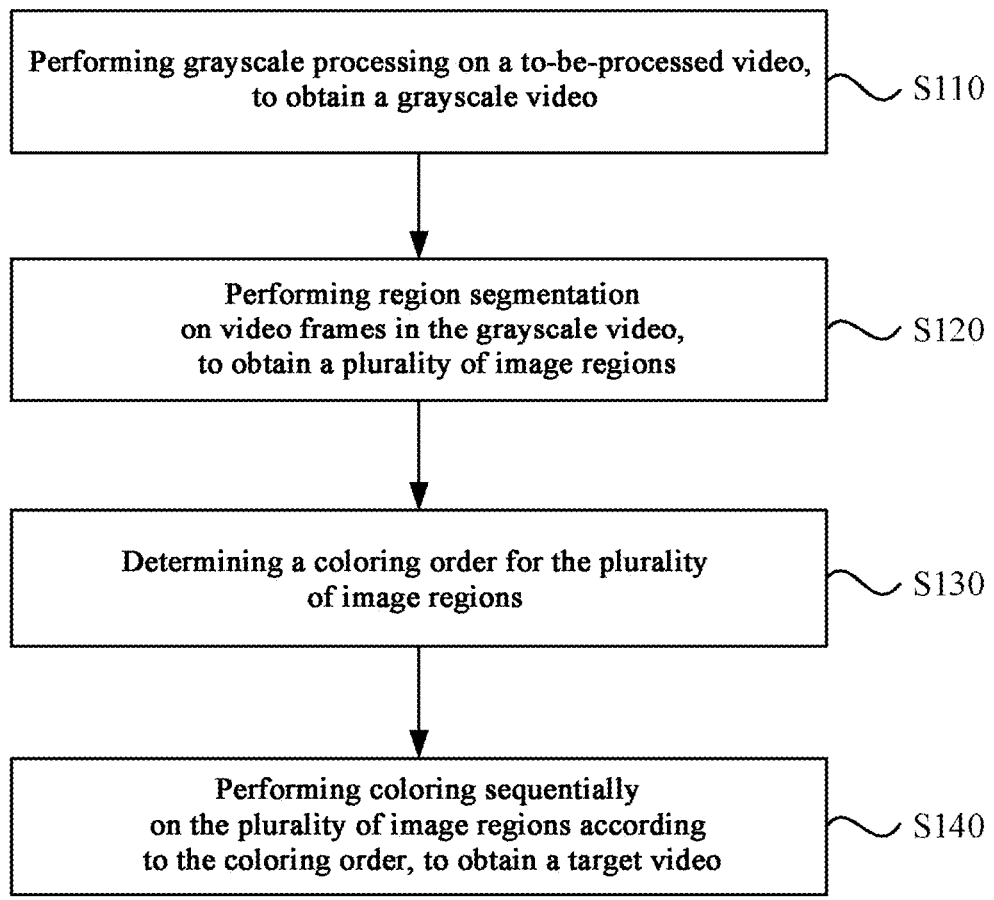
FIG. 1 illustrates a flowchart of a video generation method according to an embodiment of the present disclosure.

FIG. 1 illustrates a flowchart of a video generation method according to an embodiment of the present disclosure. The embodiment can be applied to generate a special-effect video. The method can be performed by a video generation apparatus. The apparatus can be formed by hardware and/or software and is typically integrated in a device having a video generation function, which may be an electronic device such as a server, a mobile terminal, a server cluster or the like. As shown therein, the method includes the following steps:

Step 110: performing grayscale processing on a to-be-processed video, to obtain a grayscale video.

The to-be-processed video may be acquired by a user using a camera device, or may be combined and encoded from static pictures. Performing grayscale processing on a to-be-processed video can be read as performing grayscale processing on each video frame in the to-be-processed video. The principle of the grayscale processing may include adjusting color values (Red Green Blue, RGB) of each pixel point to a same value, i.e., R=G=B. In the implementation, an average, maximum or minimum value of the three RGB values can be used as the final grayscale value, which is not limited here.

Step 120: performing region segmentation on a video frame in the grayscale video, to obtain a plurality of image regions.

The region segmentation may include dividing a video frame simply into a plurality of sub-regions, for example, four sub-regions including an upper, a lower, a left and a right sub-region, or performing semantic segmentation, instance segmentation or panoramic semantic segmentation. The semantic segmentation can be read as: classifying all pixels on the video frame. The instance segmentation can be read as a combination of target detection and semantic segmentation. The panoramic semantic segmentation can be read as detecting and segmenting all objects in a video frame, including a background. In an example, the panoramic semantic segmentation is used in the embodiment to segment a video frame, to obtain a plurality of image regions in the video frame. In this embodiment, performing panoramic semantic segmentation on the video frame can be implemented using an existing panoramic semantic segmentation model, which is not limited here.

Step 130: determining a coloring order for the plurality of image regions.

Wherein, the coloring order can be read as an order of changing each image region from grayscale to color during video playback. By way of example, assumed that regions segmented from the video include a sky region, a human region, a plant region and a ground region, coloring is performed sequentially during video playback according to the following order: the plant region—the human region—the sky region—the ground region. In this embodiment, the coloring order of the image regions are not limited.

In an example, determining the coloring order for the plurality of image regions may include: obtaining depth information of the plurality of image regions; and determining the coloring order according to the depth information.

Depth information of an image region is characterized by depth information of pixel points in the image region.

For example, obtaining the depth information of the plurality of image regions may include: for each image region, obtaining depth information of pixel points in the image region; determining an average value of the depth information of the pixel points as depth information of the image region; or determining depth information of a center point of the image region as depth information of the image region.

Wherein, the depth information of the pixel points can be determined using an existing depth estimation algorithm. That is, an average value of the depth information of the respective pixel points can be used as depth information of the current image region; or depth information of a center pixel point can be used as depth information of the current image region; or depth information of a pixel point randomly selected from the current image area can be used as depth information of the current image region. As such, the efficiency of determining depth information of an image region can be improved.

For example, subsequent to determining the depth information of the respective image regions, the order of the depth information from far to near or from near to far can be determined as the coloring order, causing the to-be-processed video to present a coloring effect from far to near or from near to far.

The picture boundary includes a left, a right, an upper or a lower boundary. Distance information of the image region away from the picture boundary may be distance information from a center point of the image region away from the picture boundary, or may be an average value of distance information of respective pixel points in the image region away from the picture boundary. Determining the coloring order according to the distance information can be read as determining an order of the distance information from large to small or from small to large as the coloring order. That is, during video playback, coloring is performed sequentially in an order from left to right, from right to left, from top to bottom or from bottom to top in a 2-dimensional (2D) image, causing the to-be-processed video to present a coloring effect from left to right, from right to left, from top to bottom or from bottom to top.

In an example, determining the coloring order for the plurality of image regions may include: performing recognition of a main object on the grayscale video; and determining the coloring order based on the main object.

The picture boundary includes a left, a right, an upper or a lower boundary. The distance information of the picture boundary away from the image region may be distance information of a center point of the image region away from the picture boundary, or an average value of distance information of respective pixel points in the image region away from the image order. Determining the coloring order base on the distance information can be read as determining an order of distance information from large to small or from small to large as the coloring order. That is, during video playback, coloring can be implemented sequentially from left to right, from right to left, from top to bottom or from bottom to up in a 2-dimensional (2D) image, to cause the to-be-processed video to present a coloring effect from left to right, from right to left, from top to bottom or from bottom to top.

In an example, determining a coloring sequence for the plurality of image regions includes: performing recognition of a main object on the grayscale video; and determining the coloring sequence based on the main object.

Figure 2:
FIG. 2 illustrates a diagram of an example of determining a coloring order based on a main object according to an embodiment of the present disclosure.

A salient object segmentation algorithm can be used to identify a main object in respective video frames in the grayscale video. For example, determining the coloring order based on the main object may be: determining a clockwise or counterclockwise order around the main object as the coloring order. By way of example, FIG. 2 is a diagram of an example of determining the coloring order based on the main object according to this embodiment. As shown therein, during video playback, the main object may be first colored, and image regions around the main object are then sequentially colored in a clockwise order about the main object, causing the to-be-processed video to present a coloring effect around the main object.

In an example, determining the coloring order for the plurality of image regions may include: if the grayscale video contains a human body, recognizing a limb action of the human body; and determining the coloring order based on the limb action.

Figure 3:
FIG. 3 illustrates a diagram of an example of determining a coloring order based on a limb action according to an embodiment of the present disclosure.

Wherein, the limb action include a hand gesture action or a foot action. In the present embodiment, an existing limb action recognition algorithm may be used to identify the limb action of the human body in the video frame. For example, determining the coloring order based on the limb action can be read as: determining image regions to be colored in the current frame based on the limb action of the human body. For example, an image region pointed with a finger. By way of example, FIG. 3 illustrates a diagram of an example for determining the coloring order based on the limb action according to an example of the present disclosure. As show therein, in a first image, as the fingers are pointed to the left region, the left region is colored; in a second image, as the fingers are pointed to the right region, the right region is colored; in a third image, both hands are pointed to the sky, the sky region is colored, causing the to-be-processed video to present such coloring effect that coloring is performed with the movement of the human body.

In an example, determining the coloring order for the plurality of image regions may include: receiving a coloring path drawn by a user; and determining the coloring order according to the coloring path.

The coloring path may be a path along which coloring is performed sequentially on image regions in the video. For example, determining the coloring order according to the coloring path can be read as: determining an order of the image regions through which the coloring path passes, i.e., during video playback, image regions are colored sequentially in the order of image regions through which the coloring path passes. In this way, the to-be-processed video presents such coloring effect that coloring is performed according to a path set by a user.

Step 140: performing coloring sequentially on the plurality of image regions according to the coloring path, to obtain a target video.

Performing coloring sequentially on the plurality of image regions according to the coloring order may include: assumed that the coloring order includes the first, the second, . . . the $N^{th}$ image, in the first m seconds, the image region ranked first in all the video frames is colored; from the $m^{th}$ to the $(m+n1)^{th}$ second, the image region ranked second in all the video frames after the $m^{th}$ second is colored; from the $(m+n1)^{th}$ to the $(m+n1+n2)^{th}$ second, the image region ranked third in all the video frames after the $(m+n1)^{th}$ second, and so on, until the video playback is completed. In this way, the special effect of sequentially coloring respective image regions can be achieved.

In the present embodiment, coloring can be performed using original colors of the respective image regions in the to-be-processed video, or the image regions can be colored using a preset map.

In an example, coloring sequentially the plurality of image pictures according to the coloring order may include: obtaining original colors of the plurality of image regions in the to-be-processed video; and coloring sequentially the plurality of image regions with the original colors according to the coloring order.

An original color is a RGB value of a pixel point in the image region in the video frame to be processed, and when the processing proceeds to the current image region according to the coloring order, the grayscale values of the respective pixel points in the current object are replaced with original RGB values, to implement coloring processing on the current image region.

In an example, performing coloring sequentially on the plurality of image regions according to the coloring order may include: obtaining a set map; and overlaying the on a corresponding image region.

Wherein, the set map may be a map selected by a user. Overlaying the set map to the respective region may include: retaining colors of pixel points of the set map which fall into the current image region, and adjusting the colors of the pixel points outside of the current image region to transparent, to overlay the set map to the respective image region. In this way, diversity of video coloring can be improved.

In an example, performing coloring sequentially on the plurality of image regions according to the coloring order may include: simultaneously coloring pixel points in an image region.

In an example, performing coloring sequentially on the plurality of image regions according to the coloring order may include: coloring, for each image region, according to a set manner.

Wherein, the set manner includes a coloring direction and a coloring speed. The coloring direction may be from left to right, from right to left, from top to bottom, from bottom to up or from a center point to the outside, which is not limited here. The coloring speed may be a coloring step size. For example, assumed that the coloring direction is from left to right, the coloring speed may be a coloring step size of N columns of pixel points, where N is greater than or equal to 1. By coloring the image regions at a certain speed in a certain direction, the present disclosure can improve entertainment of coloring the to-be-processed video.

In an example, performing coloring sequentially on the plurality of image regions according to the coloring order may include: determining a background music of the to-be-processed video; performing accent recognition on the background music, to obtain accent points; and performing coloring, at moments corresponding to the accent points, on image regions arranged according to the coloring order.

The background music may be a music selected by a user. An existing accent detection algorithm can be used to identify accents of the background music. A moment of an accent can be used as a moment of starting to color a corresponding image region in the order, i.e., it could be understood as coloring a corresponding image region in the order in an interval between two accent points adjacent to each other. In this way, the generated target video is more rhythmic when the image regions are gradually colored.

The embodiment of the present disclosure includes: performing grayscale processing on a to-be-processed video, to obtain a grayscale video; performing panoramic segmentation on video frames in the grayscale video; determining a coloring order for a plurality of image regions; coloring sequentially a plurality of image regions according to the coloring order, to obtain a target video. With the video generation method according to the embodiment of the present disclosure, a plurality of grayscale image regions obtained through panoramic semantic segmentation can be colored according to the coloring order. In this way, the present disclosure can implement the special effect of "segmentation with color retained," and can improve the entertainment of the video and user experience while further diversifying the video presentations.

Figure 4:
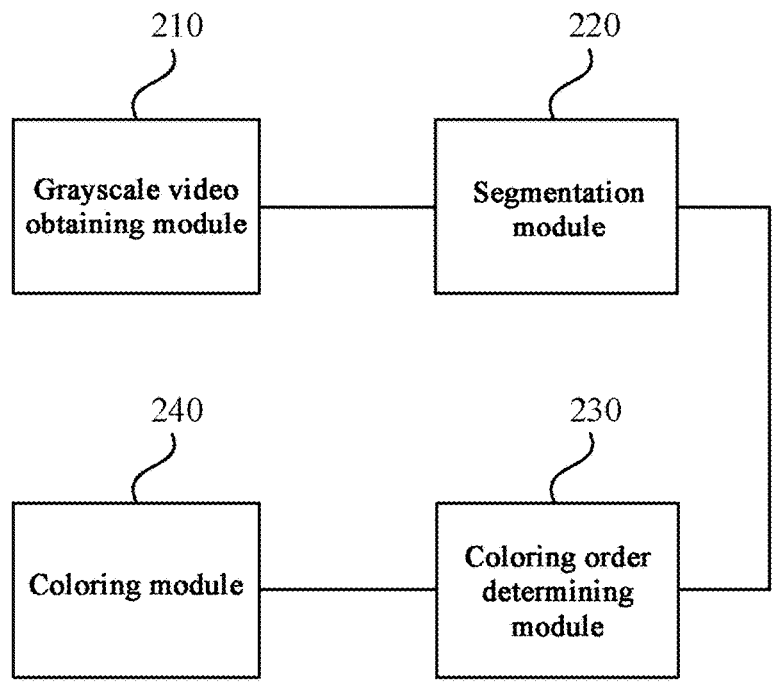
FIG. 4 illustrates a structural schematic diagram of a video generation apparatus according to an embodiment of the present disclosure.

FIG. 4 illustrates a structural schematic diagram of a video generation apparatus according to an embodiment of the present disclosure. As shown therein, the apparatus includes:

a grayscale video obtaining module 210 configured to perform grayscale processing on a to-be-processed video, to obtain a grayscale video;

a segmentation module 220 configured to perform region segmentation on video frames in the grayscale video, to obtain a plurality of image regions;

a coloring order determining module 230 configured to determine a coloring order for the plurality of image regions; and a coloring module 240 configured to perform coloring sequentially on the plurality of image regions according to the coloring order, to obtain a target video.

In an embodiment, the coloring order determining module 230 is further configured to:

obtain depth information of the plurality of image regions; and determine the coloring order according to the depth information.

In an embodiment, the coloring order determining module 230 is further configured to:

obtain, for each image region, depth information of pixel points in the image region;

determine an average value of depth information of the pixel points as depth information of the image region; or determine depth information of a center point of the image region as depth information of the image region; and determining the coloring order according to the depth information comprises:

determining an order of the depth information from far to near or from near to far as the coloring order.

In an embodiment, the coloring order determining module 230 is further configured to:

obtain distance information of the plurality image regions from a picture boundary respectively, wherein the picture boundary comprises a left boundary, a right boundary, an upper boundary or a lower boundary; and determine the coloring order according to the distance information.

In an embodiment, the coloring order determining module 230 is further configured to:

perform recognition of a main object on the grayscale video; and determine the coloring order based on the main object.

In an embodiment, the coloring order determining module 230 is further configured to:

in response to the grayscale video containing a human body, recognize a limb action of the human body, wherein the limb action comprises a hand gesture action or a foot action; and determine the coloring order based on the limb action.

In an embodiment, the coloring order determining module 230 is further configured to:

receive a coloring path drawn by a user; and determine the coloring order based on the coloring path.

In an embodiment, the coloring module 240 is further configured to:

obtain original colors of the plurality of image regions in the to-be-processed video; and color sequentially the plurality of image regions with the original colors according to the coloring order.

In an embodiment, the coloring module 240 is further configured to:

obtain a set map; and overlay the set map to a respective image region.

In an embodiment, the coloring module 240 is further configured to:

color, for each image region, according to a set manner, wherein the set manner comprises a coloring direction and a coloring speed.

In an embodiment, the coloring module 240 is further configured to:

determine a background music of the to-be-processed video;

perform accent recognition on the background music, to obtain accent points; and color, at moments corresponding to the accent points, image regions arranged according to the coloring order.

The apparatus can perform the method provided by all the embodiments of the present disclosure as described above, which has corresponding functional modules for performing the page displaying method and can achieve corresponding effects. For the technical details not exhausted here, see the description about the method provided by all the embodiments of the present disclosure as described above.

Figure 5:
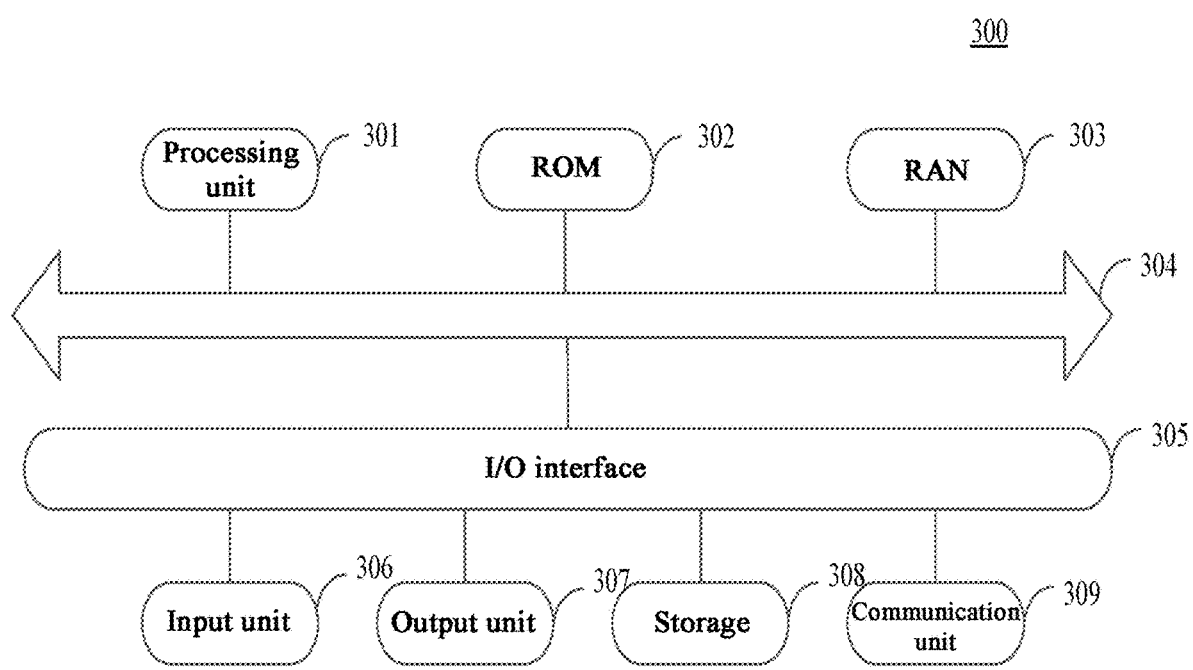
FIG. 5 illustrates a structural schematic diagram of an electronic device according to an embodiment of the present disclosure.

Reference below will be made to FIG. 5 which illustrates a structural schematic diagram of an electronic device 300 adapted to implement embodiments of the present disclosure. The electronic device according to the embodiments of the present disclosure may include, but is not limited to, a mobile terminal such as a mobile phone, a laptop computer, a digital broadcast receiver, a Personal Digital Assistant (PDA), a Portable Android Device (PAD), a Portable Media Player (PMP), an on-vehicle terminal (e.g. an on-vehicle navigation terminal) or the like, or a fixed terminal such as a digital TV, a desktop computer or the like. The electronic device as shown in FIG. 5 is provided merely as an example, without suggesting any limitation to the functions and the application range of the embodiments of the present disclosure.

As shown therein, the electronic device 300 may include a processor (e.g. a central processor, a graphics processor or the like) 301, which can execute various acts and processing based on programs stored in a Read Only Memory (ROM) 302 or a program loaded from a storage 708 to a Random Access Memory (RAM) 303. RAM 303 stores therein various programs and data required for operations of the electronic device 300. The processor 301, the ROM 302 and the RAM 303 are connected to one another via a bus 304. An input/output (I/O) interface 305 is also connected to the bus 304.

Typically, the following units may be connected to the I/O interface 305: an input unit 306 including, for example, a touchscreen, a touch pad, a keyboard, a mouse, a camera, a microphone, an accelerometer, a gyroscope and the like; an output unit 307 including, for example, a Liquid Crystal Display (LCD), a loudspeaker, a vibrator and the like; a storage 308 including, for example, a tape, a hard drive and the like; and a communication unit 309. The communication unit 309 can allow wireless or wired communication of the electronic device 300 with other devices to exchange data. Although FIG. 5 shows the electronic device 300 including various units, it would be appreciated that not all of the units as shown are required to be implemented or provided. Alternatively, more or fewer units may be implemented or provided.

According to embodiments of the present disclosure, the processes described above with reference to the flowcharts may be implemented as computer software programs. For example, embodiments of the present disclosure include a computer program product comprising a computer program carried on a computer readable medium, the computer program containing program code for performing a word recommendation method. In those embodiments, the computer program may be downloaded and installed from a network via the communication unit 309, or may be installed from the storage 308, or may be installed from the ROM 302. The computer program, when executed by the processor 301, performs the above-described functions defined in the method according to the embodiments of the present disclosure.

It should be noted that the computer readable medium according to the present disclosure may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, an RAM, an ROM, an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain, or store, a program for use by or in connection with an instruction execution system, apparatus, or device. In contrast, in the present disclosure, a computer readable signal medium may include a propagated data signal with computer readable program code embodied therein, either in baseband or as part of a carrier wave. Such propagated data signal may take many forms, including, but not limited to, an electro-magnetic signal, an optical signal, or any suitable combination thereof. A computer readable signal medium may also be any computer readable medium that is not a computer readable storage medium and that can communicate, propagate, or transmit a program for use by or in connection with an instruction execution system, apparatus, or device. Program code embodied on a computer readable medium may be transmitted using any appropriate medium, including but not limited to: electrical wires, optical cables, RF (radio frequency), etc., or any suitable combination of the foregoing.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (e.g. ad hoc peer-to-peer network), and any known network or network to be developed.

The computer-readable medium may be the one included in the electronic device, or may be provided separately, rather than assembled in the electronic device.

The computer-readable medium carries one or more programs which, when executed by the electronic device, cause the electronic device to: perform grayscale processing on a to-be-processed video, to obtain a grayscale video; perform region segmentation on video frames in the grayscale video, to obtain a plurality of image regions; determine a coloring order for the plurality of image regions; and perform coloring sequentially on the plurality of image regions according to the coloring order, to obtain a target video.

The storage medium may be a non-transitory storage medium.

Computer program codes for performing operations of the present disclosure may be written by using one or more program design language or any combination. The program design language includes, but is not limited to, object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowchart and block diagrams in the drawings illustrate the functionality and operation of possible implementations of methods, apparatus and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems which perform the specified functions or acts, or combinations of special purpose hardware and computer instructions.

The units described in the embodiments of the present disclosure may be implemented by software or hardware. Wherein, the designation of a module or unit does not in some cases constitute a limitation to the unit itself.

The functions described above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chip (SOCs), Complex Programmable Logic Devices (CPLDs), and the like.

In the context of this disclosure, a machine-readable medium may be a tangible medium that can contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of a computer-readable storage medium would include an electrical connection based on one or more wires, a portable computer diskette, a hard disk, an RAM, an ROM, an EPROM or flash memory, an optical fiber, a CD-ROM, an optical storage device, a magnetic storage device, or any suitable combination of the foregoing.

According to one or more embodiments of the present disclosure, there is provided a video generation method, comprising:

performing grayscale processing on a to-be-processed video, to obtain a grayscale video;

performing region segmentation on video frames in the grayscale video, to obtain a plurality of image regions;

determining a coloring order for the plurality of image regions; and performing coloring sequentially on the plurality of image regions according to the coloring order, to obtain a target video.

In an embodiment, determining the coloring order for the plurality of image regions comprises:

obtaining depth information of the plurality of image regions; and determining the coloring order according to the depth information.

In an embodiment, obtaining the depth information of the plurality of image regions comprises:

obtaining, for each image region, depth information of pixel points in the image region;

determining an average value of depth information of the pixel points as depth information of the image region; or determining depth information of a center point of the image region as depth information of the image region; and determining the coloring order according to the depth information comprises:

determining an order of the depth information from far to near or from near to far as the coloring order.

In an embodiment, determining the coloring order for the plurality of image regions comprises:

obtaining distance information of the plurality image regions from a picture boundary respectively, wherein the picture boundary comprises a left boundary, a right boundary, an upper boundary or a lower boundary; and determining the coloring order according to the distance information.

In an embodiment, determining the coloring order for the plurality of image regions comprises:

performing recognition of a main object on the grayscale video; and determining the coloring order based on the main object.

In an embodiment, determining the coloring order for the plurality of image regions comprises:

in response to the grayscale video containing a human body, recognizing a limb action of the human body, wherein the limb action comprises a hand gesture action or a foot action; and determining the coloring order based on the limb action.

In an embodiment, determining the coloring order for the plurality of image regions comprises:

receiving a coloring path drawn by a user; and determining the coloring order according to the coloring path.

In an embodiment, performing coloring sequentially on the plurality of image regions according to the coloring order comprises:

obtaining original colors of the plurality of image regions in the to-be-processed video; and coloring sequentially the plurality of image regions with the original colors according to the coloring order.

In an embodiment, performing coloring sequentially on the plurality of image regions according to the coloring order comprises:

obtaining a set map; and overlaying the set map on a corresponding image region.

In an embodiment, performing coloring sequentially on the plurality of image regions according to the coloring order comprises:

coloring, for each image region, according to a set manner, wherein the set manner comprises a coloring direction and a coloring speed.

In an embodiment, performing coloring sequentially on the plurality of image regions according to the coloring order comprises:

determining a background music of the to-be-processed video;

performing accent recognition on the background music, to obtain accent points; and performing coloring, at moments corresponding to the accent points, on image regions arranged according to the coloring order.

As would be appreciated by those skilled in the art, the present disclosure is not limited to the specific embodiments described herein, and various changes, readjustments and substitutions are allowed without departing from the protection scope of the present disclosure. Therefore, the present disclosure is not limited to the above embodiments although the description has been made with reference to those embodiments. Without departing from the conception of the present disclosure, more equivalent embodiments may be covered. The scope of the present disclosure should be determined based on the claims appended hereto.

We claim:

1. A video generation method, comprising:

performing grayscale processing on a to-be-processed video, to obtain a grayscale video;

performing region segmentation on video frames in the grayscale video, to obtain a plurality of image regions;

determining a coloring order for the plurality of image regions; and performing coloring sequentially on the plurality of image regions according to the coloring order, to obtain a target video, wherein the performing coloring sequentially on the plurality of image regions according to the coloring order comprises:

coloring, for each image region, according to a set manner, wherein the set manner comprises a coloring direction and a coloring speed.

2. The method of claim 1, wherein determining the coloring order for the plurality of image regions comprises:

obtaining depth information of the plurality of image regions; and determining the coloring order according to the depth information.

3. The method of claim 2, wherein obtaining the depth information of the plurality of image regions comprises:

obtaining, for each image region, depth information of pixel points in the image region; and determining an average value of depth information of the pixel points as depth information of the image region; or determining depth information of a center point of the image region as the depth information of the image region;

wherein determining the coloring order according to the depth information comprises:

determining an order of the depth information from far to near or from near to far as the coloring order.

4. The method of claim 1, wherein determining the coloring order for the plurality of image regions comprises:

obtaining distance information of the plurality image regions from a picture boundary respectively, wherein the picture boundary comprises a left boundary, a right boundary, an upper boundary or a lower boundary; and determining the coloring order according to the distance information.

5. The method of claim 1, wherein determining the coloring order for the plurality of image regions comprises:

performing recognition of a main object on the grayscale video; and determining the coloring order based on the main object.

6. The method of claim 1, wherein determining the coloring order for the plurality of image regions comprises:

in response to the grayscale video containing a human body, recognizing a limb action of the human body, wherein the limb action comprises a hand gesture action or a foot action; and determining the coloring order based on the limb action.

7. The method of claim 1, wherein determining the coloring order for the plurality of image regions comprises:

receiving a coloring path drawn by a user; and determining the coloring order according to the coloring path.

8. The method of claim 1, wherein performing coloring sequentially on the plurality of image regions according to the coloring order comprises:

obtaining original colors of the plurality of image regions in the to-be-processed video; and coloring sequentially the plurality of image regions with the original colors according to the coloring order.

9. The method of claim 1, wherein performing coloring sequentially on the plurality of image regions according to the coloring order comprises:

obtaining a set map; and overlaying the set map on a corresponding image region.

10. The method of claim 1, wherein performing coloring sequentially on the plurality of image regions according to the coloring order comprises:

determining a background music of the to-be-processed video;

performing accent recognition on the background music, to obtain accent points; and performing coloring, at moments corresponding to the accent points, on image regions arranged according to the coloring order.

11. An electronic device, comprising:

one or more processors; and a storage storing one or more computer programs;

wherein the one or more computer programs, when executed by the one or more processors, cause the one or more processors to implement operations, the operations comprise:

performing grayscale processing on a to-be-processed video, to obtain a grayscale video;

performing region segmentation on video frames in the grayscale video, to obtain a plurality of image regions;

determining a coloring order for the plurality of image regions; and performing coloring sequentially on the plurality of image regions according to the coloring order, to obtain a target video, wherein the performing coloring sequentially on the plurality of image regions according to the coloring order comprises:

coloring, for each image region, according to a set manner, wherein the set manner comprises a coloring direction and a coloring speed.

12. The electronic device of claim 11, wherein determining the coloring order for the plurality of image regions comprises:

obtaining depth information of the plurality of image regions; and determining the coloring order according to the depth information.

13. The electronic device of claim 12, wherein obtaining the depth information of the plurality of image regions comprises:

obtaining, for each image region, depth information of pixel points in the image region; and determining an average value of depth information of the pixel points as depth information of the image region; or determining depth information of a center point of the image region as the depth information of the image region;

wherein determining the coloring order according to the depth information comprises:

determining an order of the depth information from far to near or from near to far as the coloring order.

14. The electronic device of claim 11, wherein determining the coloring order for the plurality of image regions comprises:

obtaining distance information of the plurality image regions from a picture boundary respectively, wherein the picture boundary comprises a left boundary, a right boundary, an upper boundary or a lower boundary; and determining the coloring order according to the distance information.

15. The electronic device of claim 11, wherein determining the coloring order for the plurality of image regions comprises:

performing recognition of a main object on the grayscale video; and determining the coloring order based on the main object.

16. The electronic device of claim 11, wherein determining the coloring order for the plurality of image regions comprises:

in response to the grayscale video containing a human body, recognizing a limb action of the human body, wherein the limb action comprises a hand gesture action or a foot action; and determining the coloring order based on the limb action.

17. The electronic device of claim 11, wherein determining the coloring order for the plurality of image regions comprises:

receiving a coloring path drawn by a user; and determining the coloring order according to the coloring path.

18. The electronic device of claim 11, wherein performing coloring sequentially on the plurality of image regions according to the coloring order comprises:
obtaining original colors of the plurality of image regions in the to-be-processed video; and
coloring sequentially the plurality of image regions with the original colors according to the coloring order.

19. A non-transitory computer readable storage medium having computer programs stored thereon, wherein the computer programs, when executed by a processing unit, cause the processing unit to implement operations, the operations comprise:
performing grayscale processing on a to-be-processed video, to obtain a grayscale video;
performing region segmentation on video frames in the grayscale video, to obtain a plurality of image regions;
determining a coloring order for the plurality of image regions; and
performing coloring sequentially on the plurality of image regions according to the coloring order, to obtain a target video, wherein the performing coloring sequentially on the plurality of image regions according to the coloring order comprises:
coloring, for each image region, according to a set manner, wherein the set manner comprises a coloring direction and a coloring speed.

20. The non-transitory computer readable storage medium of claim 19, wherein the performing coloring sequentially on the plurality of image regions according to the coloring order further comprises:
determining a background music of the to-be-processed video;
performing accent recognition on the background music to obtain accent points; and
performing coloring, at moments corresponding to the accent points, on image regions arranged according to the coloring order.

* * * * *